United States Patent

Guo et al.

Patent Number: 6,138,066
Date of Patent: Oct. 24, 2000

[54] METHOD OF DETERMINING QUANTITIES DESCRIBING VEHICLE DRIVING BEHAVIOR

[75] Inventors: Limin Guo; Peter Wanke, both of Franfurt am Main, Germany

[73] Assignee: ITT Manufacturing Enterprises, Inc., Wilmington, Del.

[21] Appl. No.: 09/117,640

[22] PCT Filed: Jan. 22, 1997

[86] PCT No.: PCT/EP97/00287

§ 371 Date: Nov. 25, 1998

§ 102(e) Date: Nov. 25, 1998

[87] PCT Pub. No.: WO97/28037

PCT Pub. Date: Aug. 7, 1997

[30] Foreign Application Priority Data

Feb. 3, 1996 [DE] Germany .......................... 196 03 908
Feb. 24, 1996 [DE] Germany .......................... 196 07 050

[51] Int. Cl.[7] ................................................ G05D 1/08
[52] U.S. Cl. ............................................................ 701/38
[58] Field of Search .................................. 701/38, 70, 72; 303/182, 183, 192

[56] References Cited

U.S. PATENT DOCUMENTS 5,735,584  4/1998  Eckert ..................................... 303/140

FOREIGN PATENT DOCUMENTS

| | | |
|---|---|---|
| 557 893 | 1/1993 | European Pat. Off. . |
| 39 19 347 | 2/1990 | Germany . |
| 39 22 528 | 7/1990 | Germany . |
| 39 33 294 | 4/1991 | Germany . |
| 41 23 232 | 1/1993 | Germany . |
| 42 26 746 | 10/1993 | Germany . |
| 44 04 098 | 1/1994 | Germany . |
| 4226749 | 2/1994 | Germany . |
| 42 44 112 | 6/1994 | Germany . |
| 43 08 128 | 6/1994 | Germany . |
| 43 14 830 | 10/1994 | Germany . |
| 432 25 413 | 2/1995 | Germany . |
| 44 30 458 | 2/1996 | Germany . |
| 2280651 | 2/1995 | United Kingdom . |

*Primary Examiner*—Michael J. Zanelli
*Attorney, Agent, or Firm*—Rader, Fishman & Grauer PLLC

[57] ABSTRACT

A method of ensuring stability and good quality of yaw torque control even in the case of road surface transversal inclination and/or a rolling motion of the vehicle requires a transversal inclination identification. This is done by calculating the transversal inclination angle $\alpha_q$. When a transversal inclination is identified, the calculating device of the vehicle can be set to counteract the transversal inclination vigorously. Calculation of the transversal inclination angle $\alpha_q$ is based on a coordinate transformation. The value $a_{qm}$ measured by the transverse accelerometer fixed to the vehicle is related to a value $a_q$ of the ground-related transverse acceleration calculated from other sensor signals pursuant the equation $$a_{qm} = a_q \cos \alpha_q - g \sin \alpha_q.$$

The solution of this equation provides the transversal inclination angle $\alpha_q$.

6 Claims, 1 Drawing Sheet

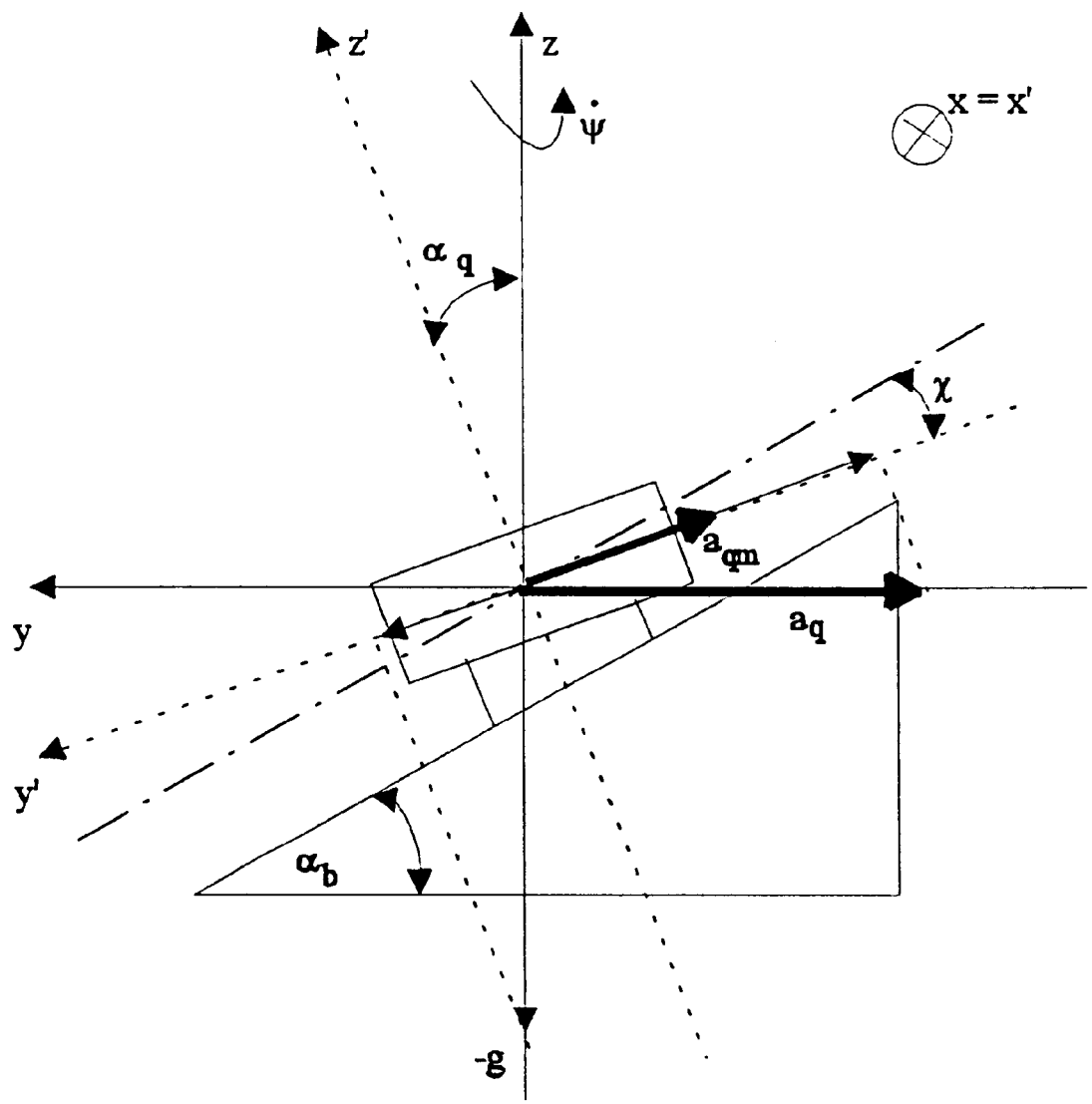

METHOD OF DETERMINING QUANTITIES DESCRIBING VEHICLE DRIVING BEHAVIOR

TECHNICAL FIELD

The present invention relates to a method of determining quantities describing the driving behavior of a four-wheel vehicle.

BACKGROUND OF THE INVENTION

German patent application No. 42 26 749 discloses a method of wherein, signals representative of the longitudinal acceleration $a_x$, the vehicle speed in a longitudinal direction $v_x$, transverse acceleration $a_y$, and yaw velocity $\dot{\psi}$ are sent to a calculating device. At least the sideslip angle $\beta$ is derived on the basis of these measured quantities in the calculating device by using a vehicle model. In the course of the calculating operation, pitching and rolling motions of the vehicle are assumed to have an insignificantly low value in order that the rotational speeds about the longitudinal and transverse axis of the vehicle can be set equal zero and a complex equation system is thus simplified. Likewise the transverse vehicle acceleration is assumed to adopt the value which is measured by transverse accelerometers fixed to the vehicle so that lateral road surface inclinations are also assumed to be transverse accelerations.

This automatically causes mistakes in the calculation of the sideslip angle. It is therefore impossible to ensure that the control will lead to the desired driving behavior even when driving on slopes without taking the transversal inclination into account.

In order to ensure stability and good quality of yaw torque control even with road transversal inclinations and/or with a rolling motion of the vehicle, transversal inclination identification is necessary. The transversal inclination identification is performed by calculating the transversal inclination angle. When a transversal inclination is identified, the controller, i.e., the calculating device, can be set to counteract transversal inclinations vigorously.

An object of the present invention is to provide a method of the above-mentioned type which permits distinguishing between a transversal inclination of the vehicle and a genuine transverse acceleration of the vehicle and indicating the respective values thereof.

This object is achieved by the present invention wherein the calculation of the transversal inclination angle is based on a transformation of coordinates.

The value measured by the transverse accelerometer fixed to the vehicle is related to a value of the ground-related transverse acceleration which is calculated from other sensor signals. 'Ground-related' implies that the z-axis of the coordinate system extends in the direction of gravity, and the x-axis and y-axis extend vertically thereto in the longitudinal and transverse direction of the vehicle.

The ground-related transverse acceleration of the vehicle can be calculated from a measured or calculated yaw velocity and the longitudinal vehicle speed or from the individual wheel speeds of one right and one left vehicle wheel each.

If desired, part of the transversal inclination angle can be assigned in a simple way as roll angle by multiplying the measured vehicle-related transverse acceleration with a vehicle-specific load-responsive factor. This factor is preferably determined one time by test measurements and stored in the calculating device in the vehicle.

BRIEF DESCRIPTION OF THE DRAWINGS

FIG. 1 shows a schematic diagram of a vehicle superimposed on a dual coordinate system.

DETAILED DESCRIPTION OF THE PREFERRED EMBODIMENTS

FIG. 1 shows the ratio of the vehicle-related coordinate system (x', y', z') to the ground-related coordinate system (x, y, z). It is assumed in this example that the vehicle has no transversal inclination angle relative to the horizontal (x=x'). The transformation can be represented by way of the Figure by the following equation:

$$a_{qm} = a_q \cos \alpha_q - g \sin \alpha_q \tag{1}$$

The variables used in the Figure are defined as follows:

$a_q$ transverse acceleration in relation to the original coordinate system $a_{qm}$ measured transverse acceleration in relation to the vehicle coordinate system g gravitational acceleration (gravitation)

$\alpha_b$ road surface transversal inclination angle roll angle $\alpha_q = \alpha_b + \chi$ vehicle transversal inclination angle in relation to the original coordinate system.

From (1) follows:

$$a_{qm} = \sqrt{a_q^2 + g^2} \cos(\gamma - \alpha_q) \tag{2}$$

and:

$$\gamma = 360° - \arccos \frac{a_q}{\sqrt{a_q^2 + g^2}}$$

According to (2) and the Figure applies:

$$\gamma - \alpha_q = 360° - \arccos \frac{a_{qm}}{\sqrt{a_q^2 + g^2}} \tag{3}$$

From (2) and (3) follows:

$$\alpha_q = \arccos \frac{a_{qm}}{\sqrt{a_q^2 + g^2}} - \arccos \frac{a_q}{\sqrt{a_q^2 + g^2}} \tag{4}$$

In order to reduce calculating operations or to program in INTEGER, the calculation can be performed either by approximation pursuant the Taylor progressive development or the Newton iteration method. The approximations pursuant the Taylor progressive development are:

$$\sqrt{a_q^2 + g^2} \cong g + \frac{a_q^2}{2g} - \frac{a_q^4}{8g^3}$$

$$\arccos(x) \cong \frac{\pi}{2} - x - \frac{x^3}{6}$$

These approximations result in the equation:

$$\alpha_q = \left( x_q - x_{qm} + \frac{x_q^3 - x_{qm}^3}{6} \right) \frac{180°}{\pi}$$

with $$x_{qm} = \frac{a_{qm}}{\sqrt{a_q^2 + g^2}} \cong \frac{a_{qm}}{g + \frac{a_q^2}{2g} - \frac{a_q^4}{8g^3}}$$

-continued and eb;normal $$x_q = \frac{a_q}{\sqrt{a_q^2 + g^2}} \cong \frac{a_q}{g + \frac{a_q^2}{2g} - \frac{a_q^4}{8g^3}}$$

The Newton iteration method is known in the art and, therefore, will not be further discussed.

The transverse acceleration $a_q$ in relation to the original coordinate system may be reproduced either by $$a_q = v_{fzg}(\dot{\psi} + \dot{\beta}) \cong v_{fzg}\dot{\psi}$$

or by any one of the following equations $$a_q = \frac{v_{hr}^2 - v_{vhl}^2}{2S} \quad a_q = \frac{v_{vr}^2 - v_{vhl}^2}{2S}$$

$$a_q = \frac{v_{vr}^2 - v_{vl}^2}{2S} \quad a_q = \frac{v_{vhr}^2 - v_{vl}^2}{2S}$$

and the following terms have been used:

$v_{fzg}$ vehicle reference speed;

$\dot{\beta}$ sideslip angle speed;

$\dot{\psi}$ yaw velocity;

$v_{vr}$ right front wheel speed;

$v_{vl}$ left front wheel speed;

$v_{hr}$ right rear wheel speed;

$v_{hl}$ left rear wheel speed;

S tire tread width of vehicle.

In the following, a possibility of determining the roll angle will be indicated. As has been described in literature, for example, in the publication by M. Mitschke, 'Dynamik der Kraftfahrzeuge' (Motor Vehicle Dynamics), volume C, Springer Verlag, 1990, the transverse acceleration $a_q$ in relation to the original coordinate system is a function of the vehicle speed and the bend radius of the track ρ. The transverse acceleration shall be calculated pursuant the following equation:

$$a_q = \frac{v_{fzg}^2}{\rho} \quad (5)$$

The roll angle is proportional to the transverse acceleration as long as the vehicle parameters are constant. In literature, the roll angle must not be exceeded with an unloaded vehicle 8°/g and a loaded vehicle 11°/g. With a <0 there results χ>0, with $a_{qm}$>0, χ<0 and with $a_{qm}$=0, χ=0. This permits an estimation of the rolling motion with an unloaded vehicle by $$\chi_{max} \cong -a_{qm}k, \quad k = \frac{8°}{9.81 \text{ m/s}^2},$$

and with a loaded vehicle by $$\chi_{max} \cong -a_{qm}k, \quad k = \frac{11°}{9.81 \text{ m/s}^2},$$

The factor k can be determined individually for each vehicle by a driving test on a plane road surface by means of a special roll angle measurement system, i.e.:

$$k \cong -\frac{\chi_m}{a_{qm}}$$

and $\chi_m$ is the roll angle measured by the measurement system.

The transversal inclination identification system was tested in a driving test in a test steep turn without activation of the yaw torque controller. In this test, the root was extracted pursuant the Newton iteration method, because the evolution function is already provided in the INTEGER programming.

It could be seen from the measurement results that the transverse acceleration in relation to the original coordinate system pursuant equation (5) is a function of the vehicle speed.

The effect of the rolling motion could be found in a comparison of the measurement results at different vehicle speeds because the road surface inclination was known and identical in all cycles. At low vehicle speeds, the transverse acceleration is low and causes a small rolling motion. The rolling motion is obvious at a higher transverse acceleration. The actual value of the transversal inclination angle, which is available as a reference value for analyzing the driving test results, can be determined by means of the roll angle measurement system. It was found in a comparison between the measured and the calculated transversal inclination angle that the calculation furnishes satisfying results at least during almost stationary driving.

What is claimed is:

1. Method of determining quantities relating to the driving behavior of a vehicle, wherein the vehicle includes a transverse accelerometer ($a_{qm}$) fixed to the vehicle, a wheel sensor on each vehicle wheel for measuring the wheel speed ($v_{vl}$, $v_{vr}$, $v_{hl}$, $v_{hr}$), and a yaw rate sensor for measuring the yaw velocity ($\dot{\psi}$), comprising the steps of:

measuring, in vehicle coordinates (x', y', z'), a value of the measured transverse acceleration ($a_{qm}$) of the vehicle, relating the vehicle coordinates to a value ($a_q$) of transverse acceleration which is calculated in ground-related coordinates (x, y, z), wherein [the]a transversal inclination ($a_q$) of the vehicle in relation to the ground-related coordinates (x, y, z) is determined by solution of the equation $$a_{qm} = a_q \cos\alpha_q - g \sin\alpha_q$$

wherein:

g designates the gravitational constant $a_q$ is a function of at least one of the wheel speeds ($v_{vl}$, $v_{vr}$, $v_{hl}$, $v_{hr}$) or yaw velocity ($\dot{\psi}$).

2. Method as claimed in claim 1, wherein the ground-related transverse acceleration ($a_q$) is calculated pursuant the equation $$a_q \cong v_{fzg}\dot{\psi}$$

and $v_{fzg}$ designates the vehicle speed measured or determined from individual wheel speeds, and $\dot{\psi}$ denotes the measured or calculated yaw velocity of the vehicle.

3. Method as claimed in claim 1, wherein the ground-related transverse acceleration ($a_q$) is calculated pursuant the equation $$a_q \cong v_{fzg}(\dot{\psi} + \dot{\beta})$$

and $v_{fzg}$ designates the vehicle speed measured or determined from individual wheel speeds, $\dot{\psi}$ denotes the measured or calculated yaw velocity of the vehicle, and $\dot{\beta}$ denotes a measured or calculated floating angle speed of the vehicle.

4. Method as claimed in claim 1, wherein the ground-related transverse acceleration ($a_q$) is calculated pursuant to the equation $$a_q = \frac{v_{xr}^2 - v_{xl}^2}{2S}$$

wherein:

$v_{xr}$ is the wheel speed of a right vehicle wheel, $v_{xl}$ is the wheel speed of a left vehicle wheel, and S is the tire tread width of the vehicle.

5. Method as claimed in claim 1, wherein a roll angle ($\chi$) of the vehicle is determined pursuant the equation $$\chi \cong -a_{qm} k$$

wherein k is a load-responsive factor defined specifically for a vehicle.

6. Method as claimed in claim 5, wherein the factor k is determined by a measurement of the transverse acceleration ($a_{qm}$) measured in vehicle coordinates (x', y', z') and a simultaneous one-time test measurement of the roll angle ($\chi_m$) pursuant the equation $$k \cong -\frac{\chi_m}{a_{qm}}$$

and is stored in a calculating device in the vehicle.

* * * * *